United States Patent
Oyama et al.

(10) Patent No.: US 12,006,161 B2
(45) Date of Patent: Jun. 11, 2024

(54) CENTERING DEVICE FOR OBJECTS TO BE CONVEYED, AND PACKAGING DEVICE FOR PACKAGING MATERIALS EQUIPPED WITH SAME

(71) Applicant: OAK TECK INC., Osaka (JP)

(72) Inventors: Akio Oyama, Osaka (JP); Kenichi Shibao, Osaka (JP)

(73) Assignee: OAK TECK INC., Osaka (JP)

( * ) Notice: Subject to any disclaimer, the term of this patent is extended or adjusted under 35 U.S.C. 154(b) by 98 days.

(21) Appl. No.: 17/785,853

(22) PCT Filed: Dec. 24, 2019

(86) PCT No.: PCT/JP2019/050605
§ 371 (c)(1),
(2) Date: Jun. 15, 2022

(87) PCT Pub. No.: WO2021/130853
PCT Pub. Date: Jul. 1, 2021

(65) Prior Publication Data
US 2023/0029717 A1     Feb. 2, 2023

(51) Int. Cl.
*B65G 47/28* (2006.01)
*B65C 9/06* (2006.01)
*B65C 9/36* (2006.01)
*B65G 47/14* (2006.01)

(52) U.S. Cl.
CPC .............. *B65G 47/28* (2013.01); *B65C 9/065* (2013.01); *B65C 9/36* (2013.01); *B65G 47/14* (2013.01)

(58) Field of Classification Search
CPC ........ B65G 47/28; B65G 47/14; B65C 9/065; B65C 9/36
USPC ............................ 198/388, 394, 397.06, 416
See application file for complete search history.

(56) References Cited

U.S. PATENT DOCUMENTS

| | | | | |
|---|---|---|---|---|
| 3,752,311 | A * | 8/1973 | Kobusch | B65G 47/256 198/398 |
| 5,950,842 | A * | 9/1999 | Baur | B65G 47/681 198/452 |
| 2003/0015399 | A1* | 1/2003 | Bennett | B65G 47/22 198/416 |
| 2014/0129532 | A1* | 5/2014 | Hogg | G06F 9/44526 707/705 |
| 2016/0176651 | A1* | 6/2016 | Landler | B65G 21/2054 198/395 |

FOREIGN PATENT DOCUMENTS

| CN | 103662748 A | 3/2014 | |
|---|---|---|---|
| CN | 113844867 A * | 12/2021 | ............. B65G 47/24 |

(Continued)

*Primary Examiner* — James R Bidwell
(74) *Attorney, Agent, or Firm* — Maschoff Brennan

(57) ABSTRACT

An object centering device configured to center a conveyed food container includes a restricting guide member having a pair of guide surfaces facing the food container and configured to be respectively in contact with at least a pair of opposed contact portions. The pair of guide surfaces of the restricting guide member includes front end portions that extend away from each other toward a downstream side of a conveyance direction of the food container. The front end portions are configured such that an angle formed by the pair of guide surfaces is changeable.

6 Claims, 7 Drawing Sheets

(56) References Cited

FOREIGN PATENT DOCUMENTS

| | | |
|---|---|---|
| JP | S45-15296 Y1 | 6/1970 |
| JP | H02-152813 A | 6/1990 |
| JP | H11-157635 A | 6/1999 |
| JP | 2000-335739 A | 12/2000 |
| JP | 2011-178550 A | 9/2011 |
| JP | 2015-020846 A | 2/2015 |
| KR | 102126483 B1 * | 6/2020 ............. B65G 47/28 |

* cited by examiner

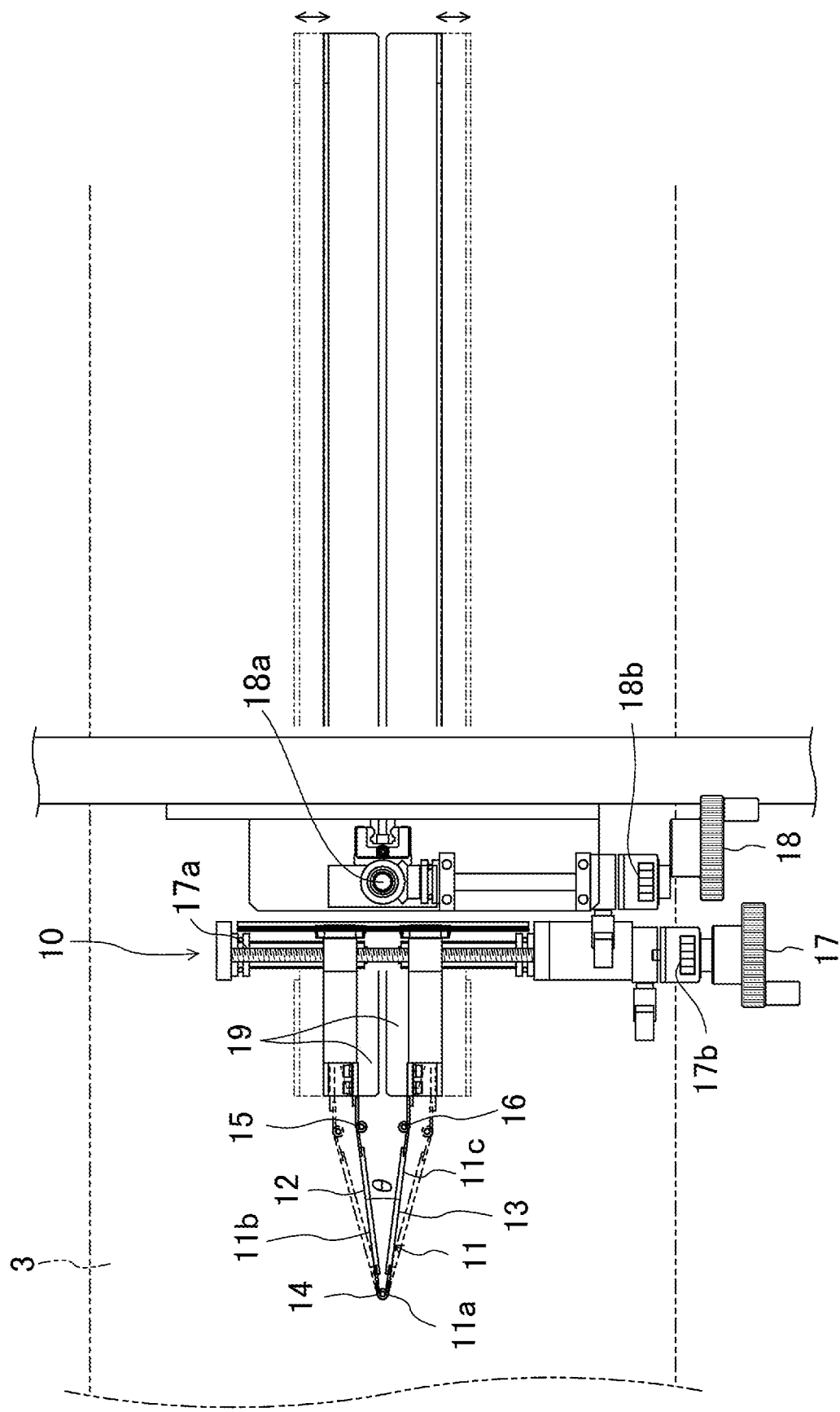

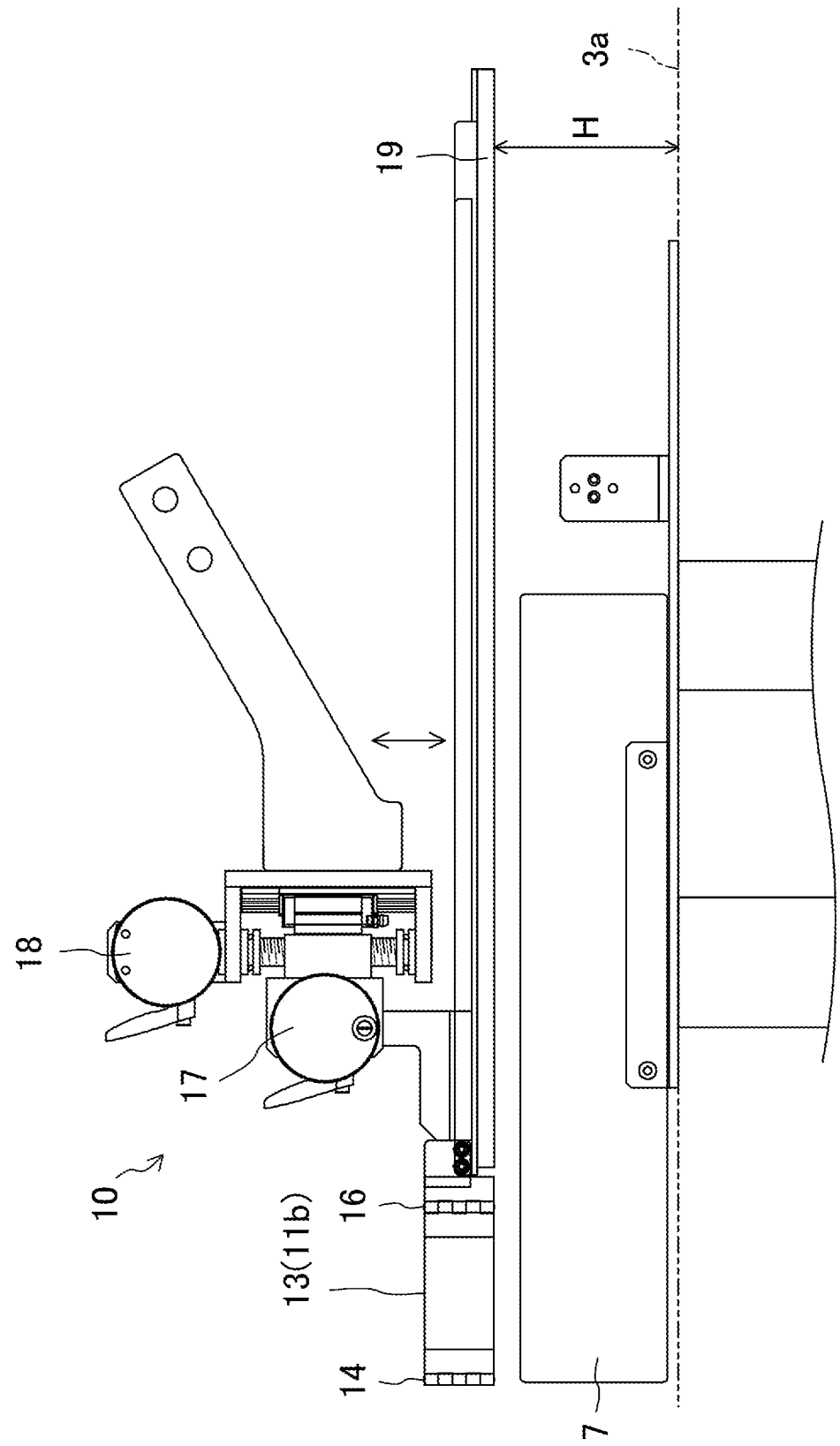

CENTERING DEVICE FOR OBJECTS TO BE CONVEYED, AND PACKAGING DEVICE FOR PACKAGING MATERIALS EQUIPPED WITH SAME

TECHNICAL FIELD

The present invention relates to a centering device for an object conveyed by, for example, a conveyor and to a packaging device for a packaging material including the centering device.

BACKGROUND ART

As described in Patent Document 1, a known conveyance direction converting device is capable of changing the conveyance direction of a container containing food by rotating the container with a desired angle with respect to the conveyance direction in conveying the container by a conveyor. In this converting device, a turntable is disposed on a conveyor for conveying the container, and the direction of the container on the turntable is changed with a desired angle and the container is conveyed downstream.

CITATION LIST

Patent Document

Patent Document 1: Japanese Patent Application Publication No. 2015-20846

SUMMARY OF THE INVENTION

Technical Problem

The known conveyance direction converting device for containers as described in Patent Document 1 has to include a turntable dedicated to changing the direction and, therefore, has the problem of a complicated structure.

The device also has the problem of a decrease in processing speed because conveyance of the container is temporarily stopped in changing the direction of the container on the turntable.

It is therefore an object of the present invention to ease positioning of an object to be conveyed while suppressing a decrease in processing speed with a simple structure.

Solution to Problem

To achieve the object, according to the present invention, a restricting guide member having a pair of guide surfaces to be individually in contact with contact portions of an object is provided.

Specifically, a first aspect is directed to an object centering device configured to center a conveyed object, and the object centering device includes a restricting guide member having a pair of guide surfaces, the pair of guide surfaces facing the object and being configured to be respectively in contact with at least a pair of opposed contact portions of the object, wherein the pair of guide surfaces of the restricting guide member has front end portions extending away from each other toward a downstream side in a conveyance direction of the object, and the front end portions are configured such that an angle formed by the pair of guide surfaces is changeable.

With this configuration, the pair of guide surfaces of the restricting guide member is respectively brought into contact with at least the pair of contact portions of the conveyed object and the angle of the object is modified with a downstream flow of the object so that a packaging material such as a label can be attached to an accurate location of the object in a subsequent process. Thus, a high-cost camera and positioning control using images from the camera are unnecessary. In addition, since the angle is changeable, variations of objects for which positioning can be controlled increase.

In a second aspect, in the device of the first aspect, the front end portions of the restricting guide member are coupled to each other such that a first front guide member and a second front guide member constituting the pair of guide surfaces are allowed to be opened and closed about a first opening/closing shaft, a rear end of the first front guide member is coupled and configured to be opened and closed about a second opening/closing shaft, and a rear end of the second front guide member is coupled and configured to be opened and closed about a third opening/closing shaft.

With this configuration, the inclination angle of the restricting guide member can be changed in accordance with the distance between the pair of contact portions of the object.

In a third aspect, in the device of the second aspect, a pair of lateral guides stands to restrict the object conveyed by the conveyor in a lateral direction of the conveyor, and the first opening/closing shaft stands at a lateral center of the pair of lateral guides.

With this configuration, while the object is conveyed by the conveyor, the entire object is centered by the pair of lateral guides, and the conveyance direction of the object can be reliably modified with the pair of guide surfaces of the restricting guide member being in contact with the at least the pair of contact portions of the object.

In the fourth aspect, in the device of the second or third aspect, the second opening/closing shaft is coupled to a first posture maintaining member extending linearly and configured to be in contact with the contact portion, and the third opening/closing shaft is coupled to a second posture maintaining member extending linearly and configured to be in contact with the contact portion.

With this configuration, the object whose orientation is modified in the front end portions is conveyed with the posture thereof maintained by the pair of posture maintaining members.

In a fifth aspect, in the device of any one of the first through fourth aspects, a height of the restricting guide member from a conveyance surface for the object is changeable in accordance with positions of the contact portions of the object.

With this configuration, since the height of the restricting guide member can be changed in accordance with the height of the contact portions of the object, the number of types of objects whose angle can be modified increases.

In a sixth aspect, in the device of the fourth aspect, the angle formed by the pair of guide surfaces is changeable by adjusting a distance between the second opening/closing shaft and the third opening/closing shaft by rotating a first handle near the restricting guide member, and a height of the restricting guide member is changeable by adjusting a height of the restricting guide member itself with a second handle near the first handle.

With this configuration, the restricting guide member can be easily moved to an optimum position in accordance with the position of at least the pair of contact portions of the object by operating the first handle and the second handle disposed close to each other. Thus, conveyed objects of various shapes can be reliably modified to a desired orientation.

In a seventh aspect, a packaging device includes: the object centering device of any one of the first through sixth aspects; a conveyor configured to convey the object; and a packaging material pressing mechanism configured to attach a packaging material to the object centered by the centering device.

With this configuration, posture of the object can be modified to a desired orientation by the restricting guide member, and thus, a packaging material can be reliably attached to a desired location of the object by the packaging material pressing mechanism.

Advantages of Invention

As described above, according to the present invention, orientation of a conveyed object is modified with a pair of guide surfaces of a restricting guide member being in contact with at least a pair of contact portions of the object, thereby making it possible to ease positioning of the object while suppressing a decrease in processing speed with a simple structure.

BRIEF DESCRIPTION OF THE DRAWINGS

FIG. 1A An enlarged plan view of an object centering device.

FIG. 1B An enlarged front view of the object centering device.

DESCRIPTION OF EMBODIMENTS

An embodiment of the present invention will be described with reference to the drawings.

Figure 2:
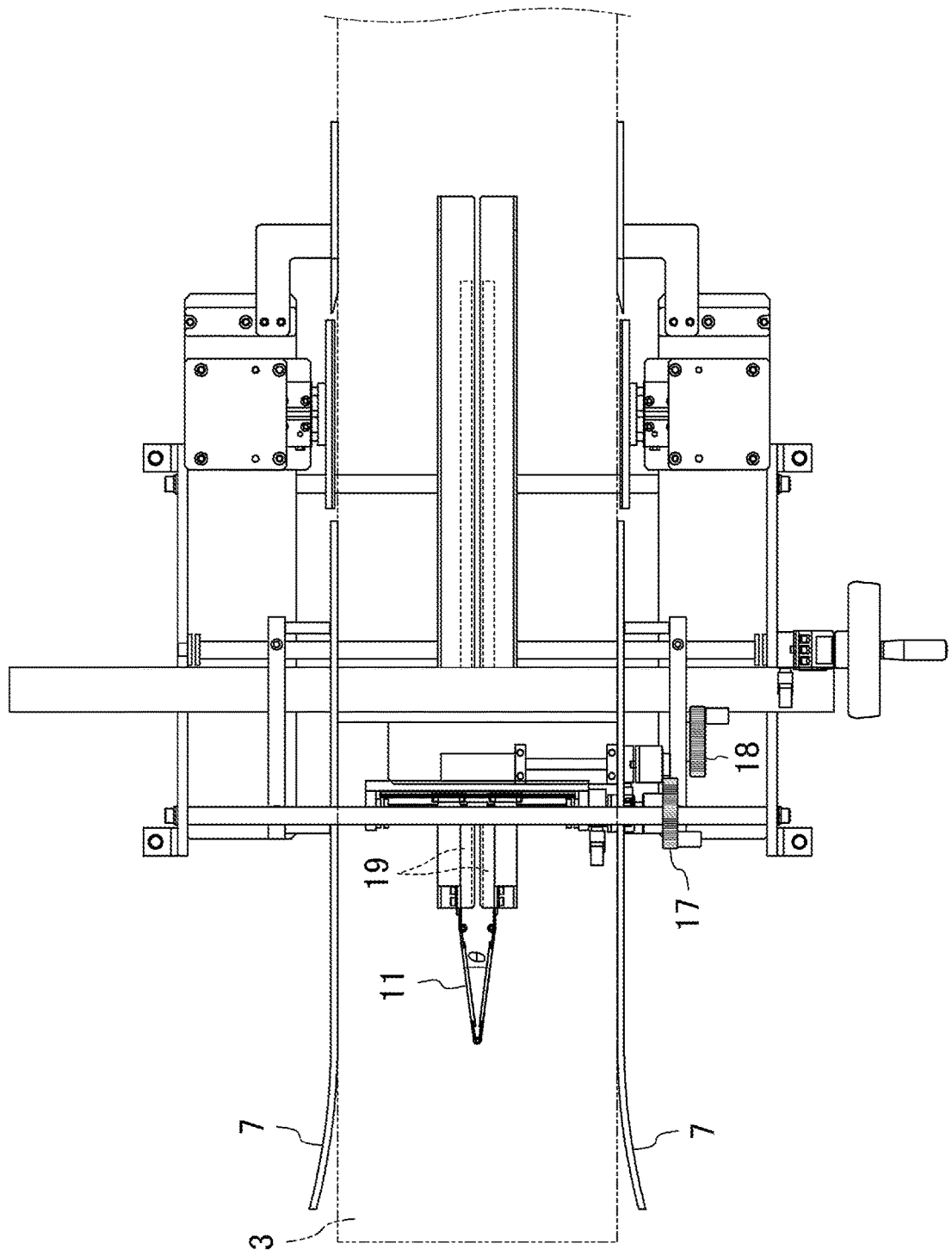
FIG. 2 A plan view illustrating a centering device for objects according to an embodiment of the present invention and a periphery thereof.
Figure 3:
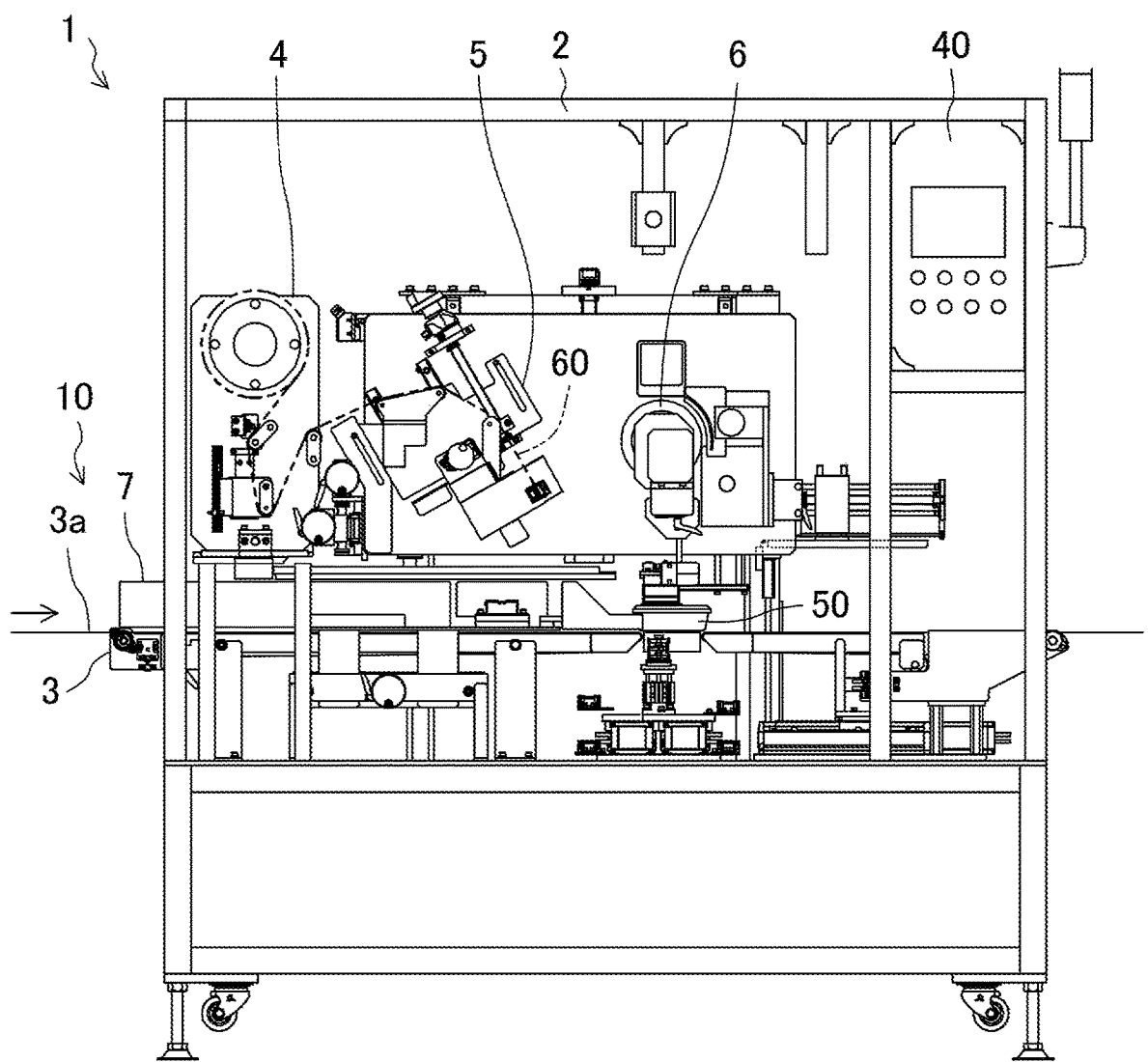
FIG. 3 A front view illustrating a packaging device for a packaging material including the object centering device.

FIGS. 1A through 2 illustrate an object centering device 10 according to an embodiment of the present invention. The object centering device 10 is configured to center a food container 50 (see FIGS. 3 through 8) for food as a conveyed object. The object centering device 10 is disposed in, for example, a packaging device 1 for a packaging material illustrated in FIG. 3.

The packaging device 1 includes a base frame 2 constituted by, for example, a metal frame. The base frame 2 is provided with a conveyor 3 such as a belt conveyor so that the food container 50 is conveyed on a conveyance surface 3a from the left to the right in FIG. 3. A label feeder 4, a label printing mechanism 5, and a label pressing mechanism 6 as a packaging material pressing mechanism, for example, are disposed above the conveyor 3. A pair of lateral guides 7 and 7 for preventing an outflow of an object from the conveyor 3 stands on both sides of the restricting conveyor 3. The front ends of the pair of lateral guides 7 and 7 expand toward the upstream side in the conveyance direction.

The label pressing mechanism 6 for restricting a movable range of the conveyed food container 50 in the lateral direction of the conveyor 3 attaches a label 60 (indicated by chain double-dashed lines in FIG. 4) as a packaging material to the food container 50 centered by the centering device 10. For example, in this embodiment, necessary items are printed on the band-shaped label 60 perpendicular to the conveyance direction, and the label 60 is attached to the food container 50.

Figure 4:
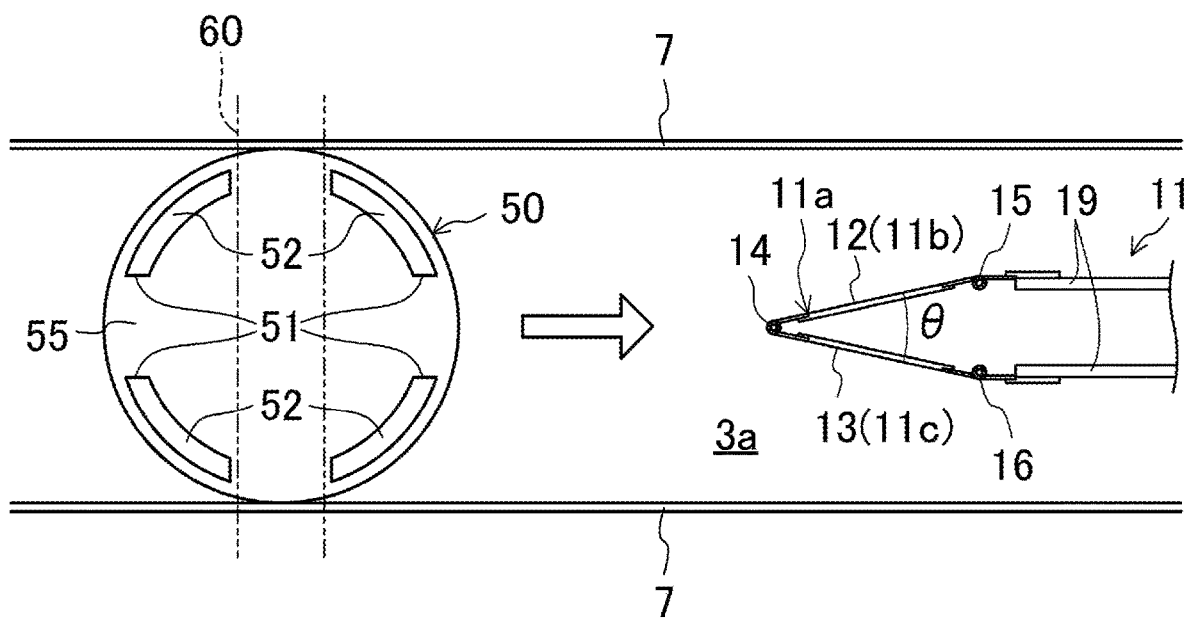
FIG. 4 A plan view generally illustrating a state where a circular container is conveyed toward a restricting guide member.
Figure 5:
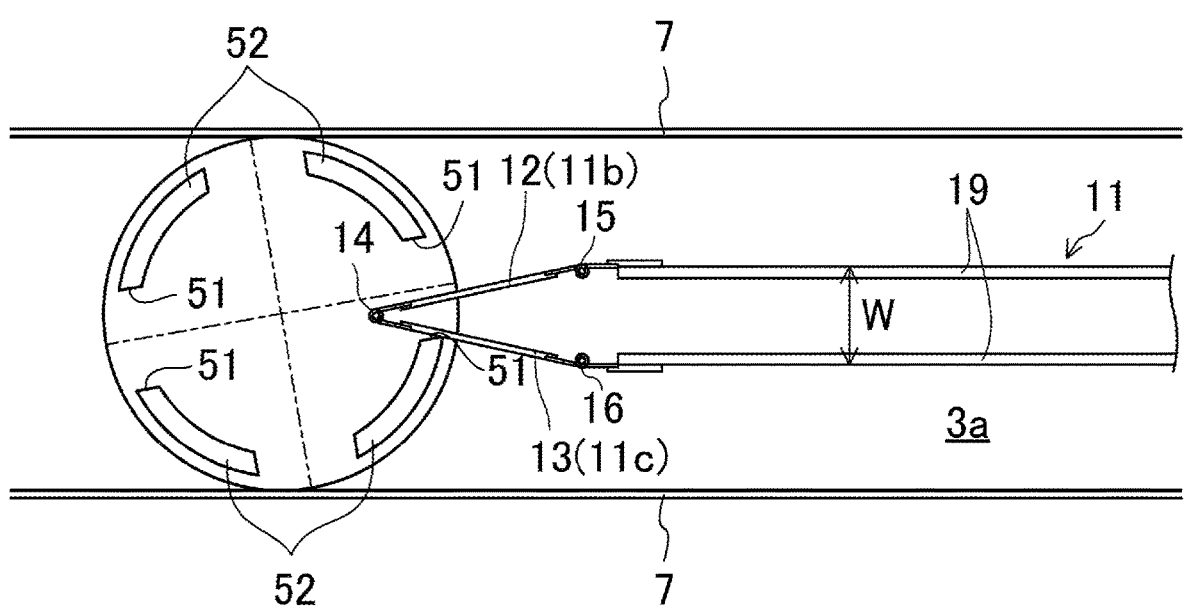
FIG. 5 A plan view generally illustrating a state where orientation of an inclined circular container that is being conveyed is changed by the restricting guide member.

In this embodiment, as illustrated in FIGS. 1A, 1B, and 4, especially the object centering device 10 includes a restricting guide member 11 having a pair of guide surfaces 11b and 11c facing the food container 50 and configured to be respectively in contact with at least a pair of opposed contact portions 51 and 51 of the food container 50.

The pair of guide surfaces 11b and 11c of the restricting guide member 11 includes front end portions 11a extending away from each other toward the downstream side in the conveyance direction of the food container 50. The front end portions 11a are configured to change an angle θ formed by the pair of guide surfaces 11b and 11c.

Specifically, the front end portions 11a of the restricting guide member 11 are configured such that a first front guide member 12 and a second front guide member 13 constituting the pair of guide surfaces 11b and 11c are allowed to be opened and closed about a first opening/closing shaft 14. The first opening/closing shaft 14 stands at the center in the lateral direction of the pair of lateral guides 7 and 7. The first opening/closing shaft 14 is similar to, for example, a swing shaft of a door hinge, and the first front guide member 12 and the second front guide member 13 are coupled to each other to be swingable about the first opening/closing shaft 14.

The rear end of the first front guide member 12 is coupled to be opened and closed about the second opening/closing shaft 15. The rear end of the second front guide member 13 is coupled to be opened and closed about a third opening/closing shaft 16. The second opening/closing shaft 15 and the third opening/closing shaft 16 have structures similar to that of the swing shaft of the door hinge.

In this embodiment, such a simple structure enables a change of the angle θ of the restricting guide member 11 in accordance with the distance between the pair of contact portions 51 and 51 of the food container 50. A pair of posture maintaining members 19 extending along the conveyance direction and configured to be in contact with the contact portions 51 and 51 is disposed downstream of the restricting guide member 11. The posture maintaining members 19 are configured to be in contact with the contact portions 51 and 51 such that the posture of the centered food container 50 is maintained.

As illustrated in FIGS. 1A and 1B, the angle θ formed by the pair of guide surfaces 11b and 11c is changeable by adjusting the distance between the second opening/closing shaft 15 and the third opening/closing shaft 16 (the width W between the pair of posture maintaining members 19) by rotating the first handle 17 near the restricting guide member 11. For example, when the first handle 17 is rotated, the first ball screw 17a extending horizontally rotates so that the distance (width W) between the second opening/closing shaft 15 and the third opening/closing shaft 16 can be increased or reduced. The distance is displayed on a first memory display 17b.

A height H of the restricting guide member 11 from the conveyance surface 3a for the food container 50 is changeable in accordance with the positions of the contact portions 51 and 51 of the food container 50. The height H of the restricting guide member 11 is changeable by adjusting the height H of the restricting guide member 11 itself with a second handle 18 near the first handle 17. When the second handle 18 is rotated, a second ball screw 18a extending vertically rotates so that the entire restricting guide member 11 moves upward and downward. The height is displayed on the second memory display 18b.

An operation of the object centering device 10 according to this embodiment will now be described.

First, the shape of the food container 50 as a conveyed object will be described with reference to FIGS. 4 through 8. The food container 50 includes, for example, a disc-shaped lid member 53 of a thin resin product and a circular cross-section container portion 54. The circular cross-section container portion 54 containing food is closed with the disc-shaped lid member 53. The band-shaped label 60 (indicated by chain double-dashed lines only in FIG. 4) is attached to the food container 50 by the packaging device 1 such that the label 60 extends in a direction perpendicular to the conveyance direction.

Four stacking ribs 52, for example, protrude upward from the disc-shaped lid member 53 to prevent displacement between upper and lower food containers 50 in stacking these food containers 50. Each of the stacking ribs 52 includes at least a pair of contact portions 51 and 51 (where two pairs of, that is, four in total, contact portions 51 are formed in this embodiment, but at least a pair of opposed contact portions 51 and 51 is sufficient). A flat surface 55 is formed between the pair of opposed contact portions 51, and the label 60 is attached to the flat surface 55 to extend along a direction perpendicular to the conveyance direction. The flat surface 55 is provided with no projections that might be hooked to the bottom surface of the restricting guide member 11.

First, as illustrated in FIG. 4, the food container 50 is conveyed from the downstream side in a state where the label 60 can be easily attached to the food container 50. Even in this state, however, the food container 50 is conveyed with an inclination to some extent with respect to the conveyance direction, as illustrated in FIG. 6.

Even if the food container 50 is conveyed in an inclined state, the pair of guide surfaces 11b and 11c of the restricting guide member 11 is respectively in contact with the two front and rear pairs of contact portions 51 and 51 of the conveyed food container 50. Specifically, while the food container 50 is conveyed by the conveyor 3, the entire food container 50 is centered by the pair of lateral guides 7 and 7, and the pair of guide surfaces 11b and 11c of the restricting guide member 11 is brought into contact with the pairs of contact portions 51 and 51 of the food container 50 so that the angle (posture) of the food container 50 is gradually modified in accordance with a downstream conveyance of the food container 50.

Figure 6:
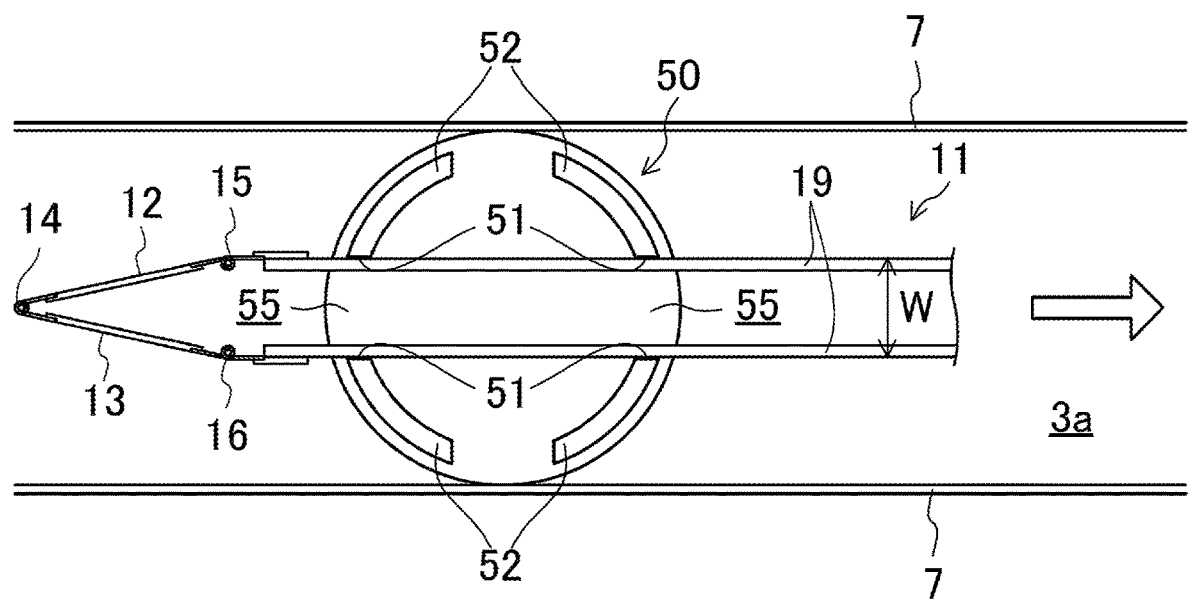
FIG. 6 A plan view generally illustrating a state where the circular container is conveyed with a pair of contact portions of the circular container being guided by a pair of guide surfaces of the restricting guide member.
Figure 7:
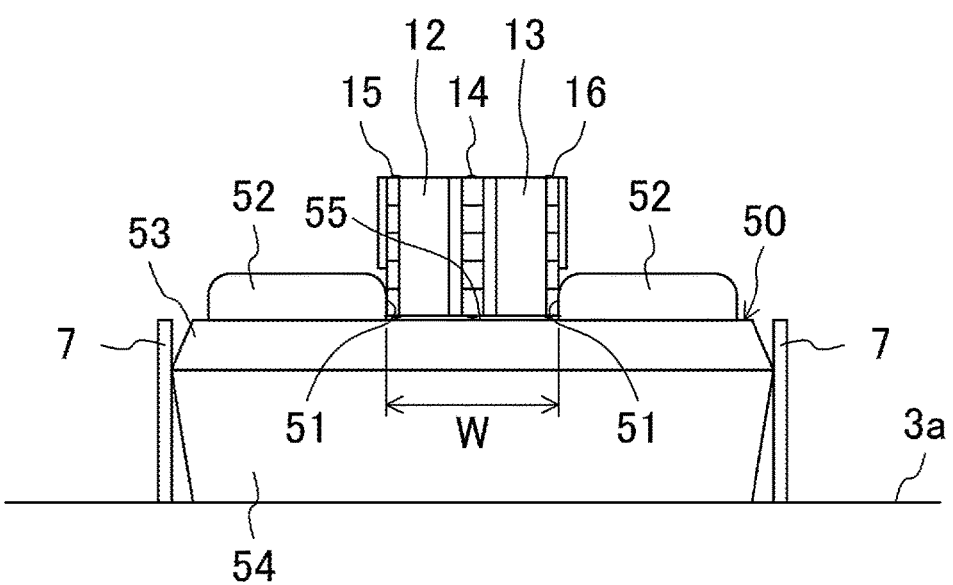
FIG. 7 A left side view generally illustrating a state where the width of the restricting guide member is adjusted in accordance with an interval between the pair of contact portions of the circular container.
Figure 8:
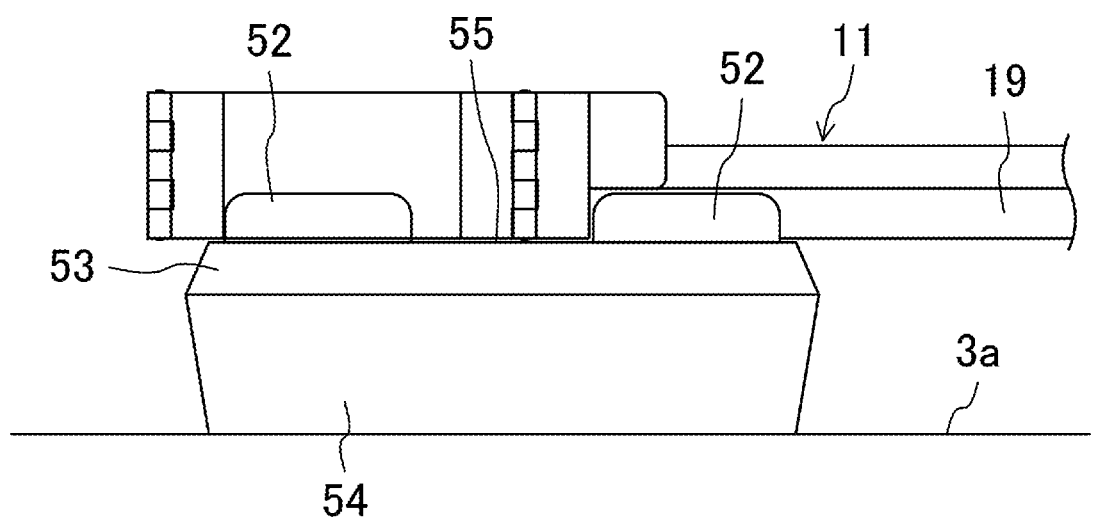
FIG. 8 A front view generally illustrating a state where the height of the restricting guide member is adjusted in accordance with the height of the pair of contact portions of the circular container.

As illustrated in FIG. 6, while the food container 50 passes through the pairs of guide surfaces 11b and 11c, the food container 50 is conveyed downstream by the pair of posture maintaining members 19 while being hardly inclined.

In a subsequent process, the label 60 can be attached to an accurate position.

On the other hand, in the case of conveying food containers 50 of different shapes, the angle θ and the height H of the restricting guide member 11 are adjusted by operating the first handle 17 and the second handle 18 disposed close to each other. Then, the restricting guide member 11 can be easily moved to an optimum position in accordance with the positions of the contact portions 51 and 51 of the food container 50, and thus, the orientation of the conveyed food containers 50 can be easily and reliably modified.

In the manner described above, in this embodiment, since the food container 50 is modified to a desired posture by the restricting guide member 11, the label pressing mechanism 6 can reliably attach the label 60 to a desired location of the food container 50. Thus, in this embodiment, a high-cost camera and positioning control using images from the camera are unnecessary.

As a result, the object centering device 10 according to this embodiment eases positioning of the food container 50 while suppressing a decrease in processing speed with a simple structure.

Other Embodiments

The embodiment of the present invention may have the following configurations.

Specifically, in the centering device 10 of the embodiment described above, the band-shaped label 60 is disposed in an upstream portion of the packaging device 1 for a packaging material to be attached to the food container 50, but the invention is not limited to the packaging device 1 for the packaging material, and is widely applicable to a device in which the orientation of the food container 50 conveyed on the conveyor 3 needs to be modified by using at least the pair of contact portions 51 and 51.

The foregoing embodiments are merely preferred examples in nature, and are not intended to limit the invention, applications, and use of the application.

DESCRIPTION OF REFERENCE CHARACTERS

| | |
|---|---|
| 1 | packaging device for packaging material |
| 2 | base frame |
| 3 | conveyor |
| 3a | conveyance surface |
| 4 | label feeder |
| 5 | label printing mechanism |
| 6 | label pressing mechanism (packaging material pressing mechanism) |
| 7, 7 | lateral guide |
| 10 | centering device |
| 11 | restricting guide member |
| 11a | front end portion |
| 11b, 11c | guide surface |
| 12 | first front guide member |
| 13 | second front guide member |
| 14 | first opening/closing shaft |
| 15 | second opening/closing shaft |
| 16 | third opening/closing shaft |
| 17 | first handle |
| 18 | second handle |
| 19 | posture maintaining member |
| 50 | food container |
| 51, 51 | contact portion |
| 52 | stacking rib |

| | |
|---|---|
| 53 | disc-shaped lid member |
| 54 | circular cross-section container portion |
| 55 | flat surface |
| 60 | label (packaging material) |

The invention claimed is:

1. An object centering device configured to center a conveyed object, the object centering device comprising
a restricting guide member having a pair of guide surfaces, the pair of guide surfaces facing the object and being configured to be respectively in contact with at least a pair of opposed contact portions of the object, wherein
the pair of guide surfaces of the restricting guide member has front end portions extending away from each other toward a downstream side in a conveyance direction of the object,
the front end portions are configured such that an angle formed by the pair of guide surfaces is changeable,
the front end portions of the restricting guide member are coupled to each other such that a first front guide member and a second front guide member constituting the pair of guide surfaces are allowed to be opened and closed about a first opening/closing shaft,
a rear end of the first front guide member is coupled and configured to be opened and closed about a second opening/closing shaft, and
a rear end of the second front guide member is coupled and configured to be opened and closed about a third opening/closing shaft.

2. The object centering device according to claim 1, wherein
a pair of lateral guides stands to restrict the object conveyed by the conveyor in a lateral direction of the conveyor, and
the first opening/closing shaft stands at a lateral center of the pair of lateral guides.

3. The object centering device according to claim 1, wherein
the second opening/closing shaft is coupled to a first posture maintaining member extending linearly and configured to be in contact with the contact portion, and
the third opening/closing shaft is coupled to a second posture maintaining member extending linearly and configured to be in contact with the contact portion.

4. The object centering device according to claim 1, wherein
a height of the restricting guide member from a conveyance surface for the object is changeable in accordance with positions of the contact portions of the object.

5. The object centering device according to claim 3, wherein
the angle formed by the pair of guide surfaces is changeable by adjusting a distance between the second opening/closing shaft and the third opening/closing shaft by rotating a first handle near the restricting guide member, and
a height of the restricting guide member is changeable by adjusting a height of the restricting guide member itself with a second handle near the first handle.

6. A packaging device for a packaging material, the packaging device comprising:
the object centering device according to claim 1;
a conveyor configured to convey the object; and
a packaging material pressing mechanism configured to attach a packaging material to the object centered by the centering device.

\* \* \* \* \*